United States Patent [19]

Kammoto et al.

[11] Patent Number: 4,841,358
[45] Date of Patent: Jun. 20, 1989

[54] DEVICE FOR READING A COLOR IMAGE FROM AN ORIGINAL DOCUMENT WITH RECIPROCATING FILTER

[75] Inventors: Yoshiaki Kammoto; Masanori Saito, both of Tokyo, Japan

[73] Assignee: Ricoh Company, Ltd., Tokyo, Japan

[21] Appl. No.: 911,876

[22] Filed: Sep. 26, 1986

[30] Foreign Application Priority Data

Sep. 30, 1985 [JP] Japan ................................ 60-214491

[51] Int. Cl.⁴ .............................................. H04N 9/07
[52] U.S. Cl. ......................................... 358/75; 358/42
[58] Field of Search ...................... 358/75, 42, 98, 909

[56] References Cited

U.S. PATENT DOCUMENTS

| | | | |
|---|---|---|---|
| 2,538,071 | 1/1951 | Young, Jr. | 358/58 |
| 2,721,893 | 10/1955 | Vanderhooft | 358/42 |
| 4,518,988 | 5/1985 | Saitoh et al. | 358/75 |
| 4,622,584 | 11/1986 | Nagasaki et al. | 358/42 |
| 4,631,582 | 12/1986 | Nagasaki et al. | 358/98 |
| 4,638,353 | 1/1987 | Nagasaki et al. | 358/42 |
| 4,713,683 | 12/1987 | Fujimori et al. | 358/42 |

Primary Examiner—Edward L. Coles, Sr.
Assistant Examiner—Robert M. Bauer
Attorney, Agent, or Firm—Oblon, Fisher, Spivak, McClelland & Maier

[57] ABSTRACT

A color document image reading device provides for inputting of a color image on an original document to various kinds of image processing apparatus. The color document image is decomposed into predetermined pixels, then photoelectrically converted into an electric signal, and then outputted with the pixels arranged time-serially. A filter has a plurality of color separation filter elements which are arranged in a flat configuration while being physically isolated from each other by a light-intercepting area having a predetermined width. The filter is driven by filter drive means in a reciprocal motion in a direction perpendicular to an optical axis, whereby any of the filter elements is brought into alignment with the optical axis. The filter is supported in such a manner as to be movable in a direction of movement of the filter drive means while being prevented from moving in the other directions.

6 Claims, 10 Drawing Sheets

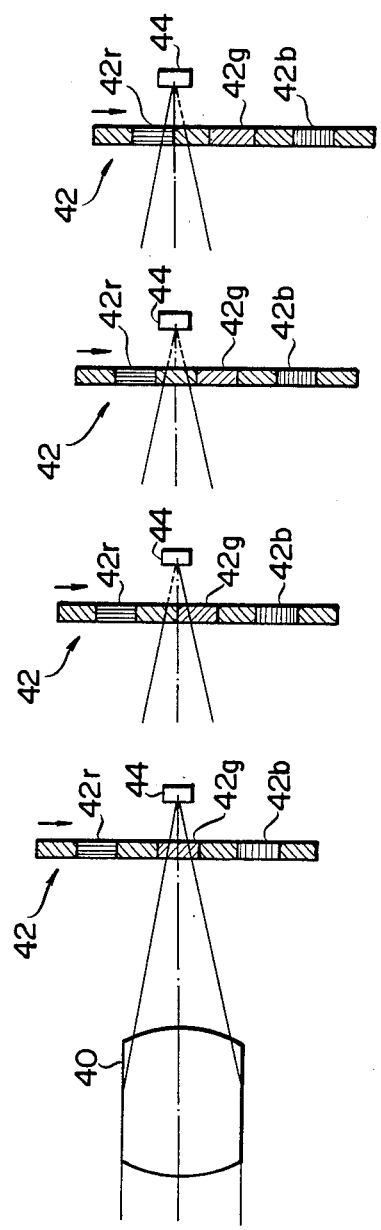

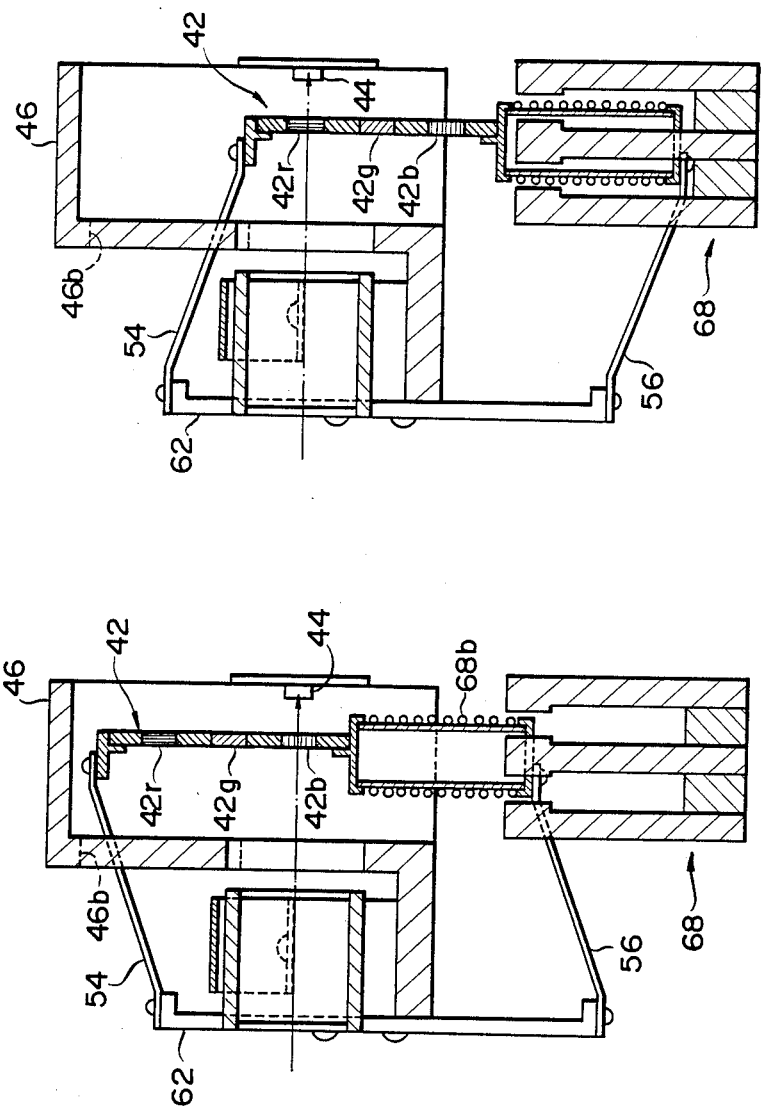

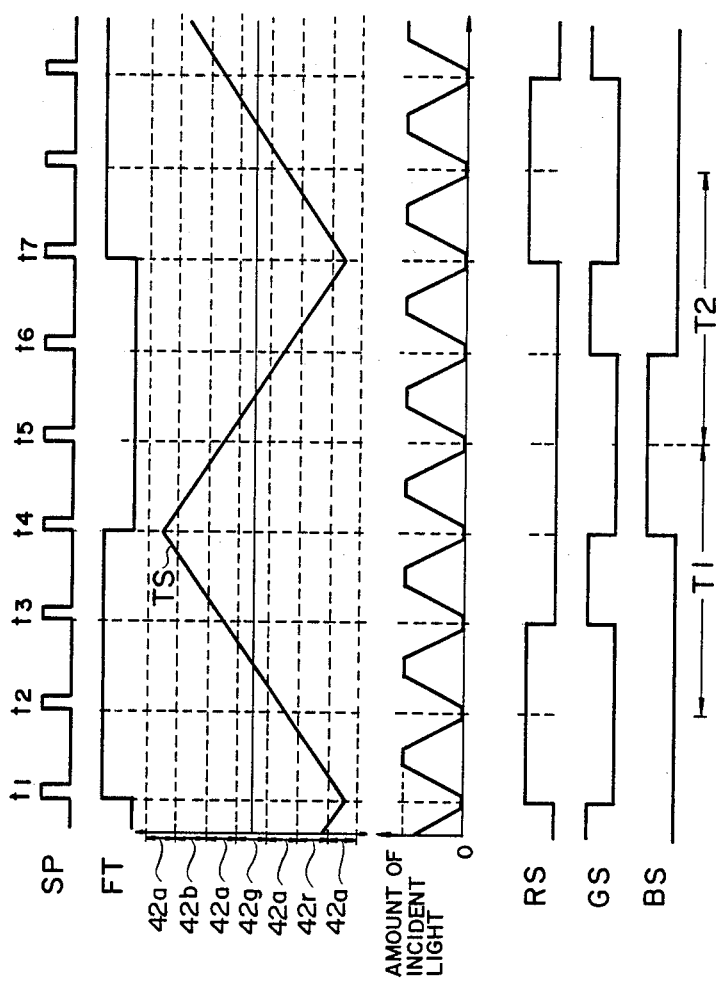

DEVICE FOR READING A COLOR IMAGE FROM AN ORIGINAL DOCUMENT WITH RECIPROCATING FILTERcBACKGROUND OF THE INVENTION

1. Field of the Invention

The present invention relates to a device for reading a color image which is printed on an original document.

2. Discussion of the Background

An image reading device, or image reader, is an implementation generally used to input images which are recorded on a document into various kinds of image processing apparatus. The image reader is constructed to decomposte an image into pixels each having predetermined dimensions and photoelectrically convert them into an electric signal associated with their density (or luminance), the signal being outputted with the pixels arranged time-serially. Meanwhile, reading an image together with information on its colors is advantageous for various kinds of processing to be performed more accurately and effectively. Such a principle has been embodied by a color document image reader which is capable of reading an image on a document including its color information.

A color document image reader mentioned above reads an image in full color (or in a predetermined number of colors) by optically decomposing it into three primary colors and photoelectrically converting it component by component of the three primary colors. Some different kinds of methods are available for the color separation and, usually, the photoelectric conversion of images (pixels) is performed using a line image sensor.

Color document readers known in the art include a so-called light source sequential type image reader in which fluorescent lamps capable of respectively emitting light of three primary colors, i.e., green, red and blue, are turned on one by one and, timed to such sequential activation of the lamps, a line image sensor is operated to read an image, thereby decomposing a document image into three primary colors. Another example of the prior art image readers is one which uses a fluorescent lamp emitting white light, a dichroic prism having a surface for reflecting a blue component and a surface for reflecting a red component, and line image sensors assigned one-to-one to the respective colors; an image on a document which is illuminated by the white light is decomposed into the three primary colors by the dichroic prism and line image sensor. Another example is one using a white fluorescent lamp and a disk-like color separation filter device in which a red filter transparent for a red component, a blue filter transparent for a blue component and a green filter transparent for a green component are arranged in identical sectorial shapes.

The light source sequential type scheme, however, consumes a considerable reading time since the fluorescent lamps, which are poor in buildup characteristic, are switched from one to another for each line. In addition, because the color separation characteristic depends on the output spectral characteristics of the respective lamps, it is impossible to select a desired color separation characteristic. The dichroic prism type scheme is faster in reading speed than the others, but it requires an accurate adjusting mechanism so that the three line image sensors may read the same read line on a document. Another disadvantage of the dichroic prism type scheme is that peripheral processing circuits become complicated thus becoming increasing expensive. Further, the color separation filter type scheme suffers from a drawback because the chord of each filter element extends in the same direction as the light-sensitive surface of a line image sensor. Therefore, filter device itself and mechanisms surrounding the filter device are bulky. It also suffers from a drawback that when a color component to be separated is switched, a color component associated with the nearby filter is mixed with the the one to be separated.

Expedients for solving the problems discussed above are disclosed in Japanese Utility Model Laid-Open Publication Nos. 59-166556 and 59-181443 which are commonly entitled "Color Document Reading Device." Specifically, the first-mentioned expedient is such that a plurality of color separation stripe filters are reciprocated in front of a line image sensor so as to switch the color to be read. The second-mentioned expedient, on the other hand, uses a plurality of color separation stripe filters and intercepting plates which are arranged alternately with each other to eliminate mixture of different colors. Even such expedients are not fully acceptable, however. Namely, the former allows the stripe filters to move in a direction other than the expected direction of reciprocation while the latter needs a bulky mechanism for driving the stripe filters.

To better understand the present invention, a reference will be made to prior art color document image reading devices, shown in FIGS. 1, 2, 3A and 3B.

In FIG. 1, a prior art light source sequential type image reading device, or image reader, 10 is constructed such that image light reflected from that portion of an original document 14, which is laid on a glass platen 12, which is located on a read line RL is redirected by a mirror 16 toward a lens 18 and thereby focused onto a light-sensitive surface of a line image sensor 20. Such a light source sequential type image reader is provided with fluorescent lamps LG, LR and LB each emitting light of one of three primary colors, i.e., green, red and blue and turned on one after another. The line image sensor 20 is operated in synchronism with the alteration of the lamps LG, LR and LB, thereby decomposing an image on the document 14 into three primary colors.

FIG. 2 shows another prior art color document image reader of the type using a dichroic prism. In FIG. 2, the same or similar structural elements are designated by like reference numerals. In the image reader 22 of FIG. 2, a light beam focused by the lens 18 is incident to a dichroic prism 24 which is provided with a surface 24a for reflecting a blue light component and a surface 24b for reflecting a red light component. A blue, a red and a green component separated by the prism 24 are each focused onto one of line image sensors 20b, 20r and 20g which is assigned thereto. In this case, the light source is implemented with a fluorescent lamp LW which emits white light. The line image sensors 20r, 20g and 20b are operated at the same time to simultaneously produce image signals which are associated with the three primary colors, respectively.

In FIGS. 3A and 3B, there is shown still another prior art color document image reader which uses a disk-like color separation filter assembly. In FIGS. 3A and 3B, the same or similar structural elements as those shown in FIGS. 1 and 2 are designated by like reference numerals. Specifically, the image reader includes a color separation filter assembly 28 which is mounted on an output shaft of a motor 30. The filter assembly 28 is located closer to the read line RL than the lens 18 and such that a chord thereof extends in the same direction as the light-sensitive surface of the line image sensor 20. As shown in FIG. 3B, the filter assembly 28 comprises three filters 28r, 28g and 28b which are provided with identical sectorial configurations. The filter 28r is transparent for a red light component, the filter 28g for a green light component, and the filter 28b for a blue light component. In this construction, the line image sensor 20 is operated with the filer 28r aligned with an optical axis to produce an image signal which is associated with a red component. Likewise, it is operated with the filter 28g aligned with the optical axis to produce an image signal which is associated with a green component, and operated with the filter 28b aligned with the optical axis to produce an image signal which is associated with a blue light component.

All the prior art image readers described above are not satisfactory for one reason or another as previously discussed.

SUMMARY OF THE INVENTION

It is therefore an object of the present invention to provide a device which is capable of reading a document image with a simple construction and by separating colors adequately.

It is another object of the present invention to provide a device for reading a image on a document.

A device for reading a color image on a color original document of the present invention comprises a line image sensor for decomposing the color image which is incident to a light-sensitive surface of the line image sensor into pixels each having a predetermined configuration and photoelectrically converting the pixels, an optical arrangement for conducting the color image located on a read line to the light-sensitive surface of the line image sensor, a flat filter having a plurality of color separation stripe filter elements each having a predetermined size and separating a predetermined color component, the filter elements being spaced at a predetermined distance from each other and extending along a longitudinal direction of the light-sensitive surface, a filter drive mechanism for driving the flat filter in a reciprocal motion in a plane which is perpendicular to an optical axis so as to bring the filter elements into alignment with the optical axis, and a filter support for supporting the filter in such a manner as to allow the filter to move in a reciprocating direction while restricting movement of the filter in other directions.

The above and other objects, features and advantages of the present invention will become more apparent from the following detailed description taken with the accompanying drawings.

BRIEF DESCRIPTION OF THE DRAWINGS

FIGS. 7A and 7D is a schematic view demonstrating the operation of a light intercepting section of the device of FIG. 4;

FIG. 8 is a fragmentary section showing a particular condition in which a light beam is transmitted through a blue filter element of the filter as shown in FIG. 6;

FIG. 9 is a view similar to FIG. 8, showing another condition in which a light beam is transmitted through a red filter element;

FIGS. 11A to 11G show waveforms representative of the operation of the control system;

DESCRIPTION OF THE PREFERRED EMBODIMENTS

Figure 1:
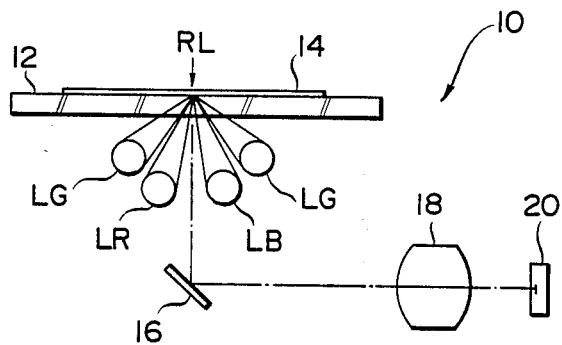
FIG. 1 is a schematic view of a prior art color document image reading device.
Figure 2:
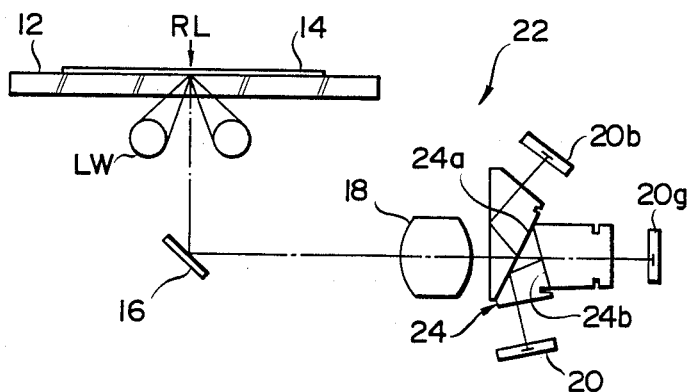
FIG. 2 is a schematic view of another prior art color document image reading device.
Figure 3A:
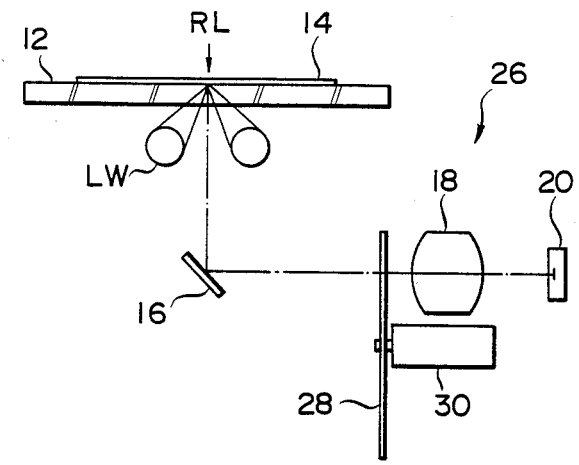
FIG. 3A is a schematic view of still another prior art color document image reading device.
Figure 3B:
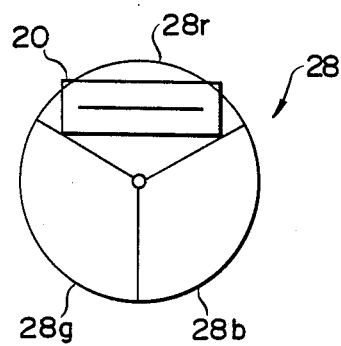
FIG. 3B is a front view of an example of prior art filters.
Figure 4:
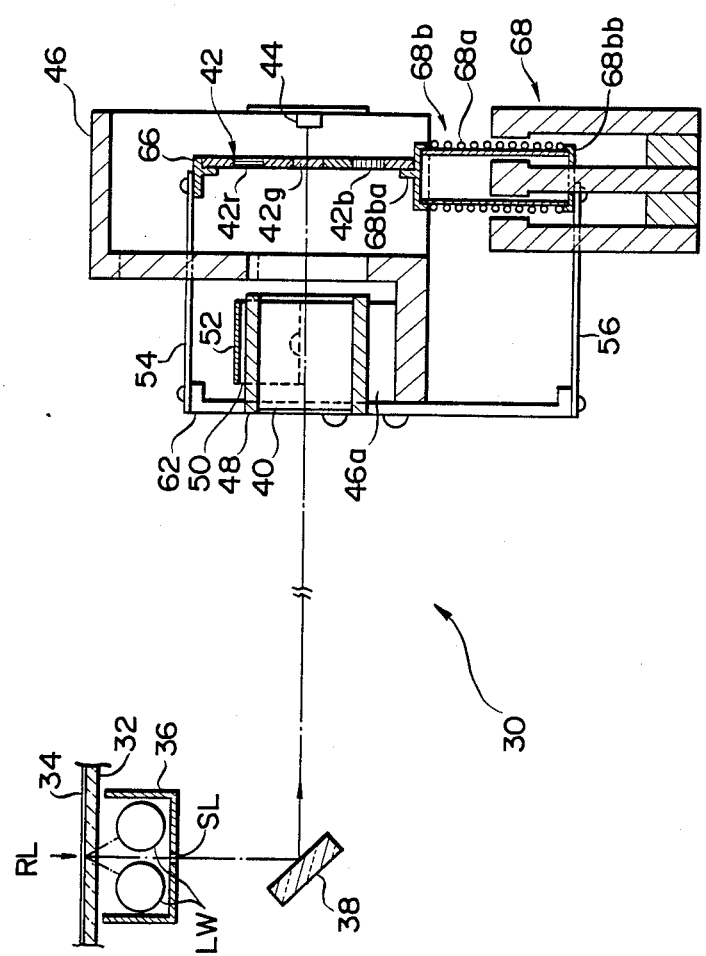
FIG. 4 is a fragmentary section of a color document image reading device, particularly optics thereof, embodying the present invention.
Figure 5:
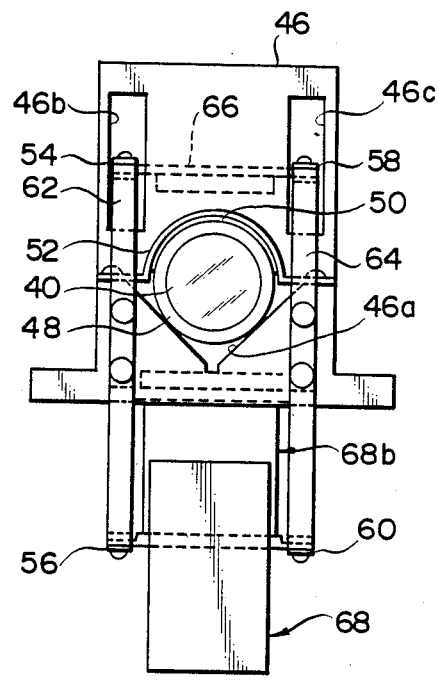
FIG. 5 is a front view of the device of FIG. 4.

Referring to FIG. 4, a color document image reader embodying the present invention is shown and generally designated by the reference numeral 30. As shown, an original document 34 laid on a glass platen 32 is illuminated by white fluorescent lamps LW. Light reflected from an image which is positioned on a read line RL on the document 34 is passed through a slit SL which is formed through a case 36 adapted to accommodate the lamps LW. The light from the slit SL is reflected by a mirror 38 toward a lens 40 which then focuses the light onto a line image sensor 44 via a flat filter 42. The lens 40 and the line image sensor 44 are integrally mounted on a lens block 46. Specifically, the lens block 46 includes a lens mount portion 46a for mounting the lens 40 which, as shown in FIG. 5, is formed as a generally V-shaped recess. A lens holder 48 which accommodates the lens 40 therein is fixed to the lens mount portion 46a by a belt 52 through an imtermediate material 50. Brackets 62 and 64 adapted to anchor leaf springs 54, 56, 58 and 60 are rigidly mounted on the lens block 46 at both sides of the lens mount portion 46a.

A mounting member 66 is provided on the upper end of the filter 42. The other end of each of the leaf springs 54 and 58 is anchored to the member 66. The lower end of the member 66 is mounted on the upper end 68ba of the bobbin 68b around which a movable coil 68a is wound. The movable coil 68a constitutes a part of a linear motor 68 which functions to drive the filter 42 up and down in a reciprocal motion. The other end of each of the leaf springs 56 and 60 is fixed to the lower end 68bb of the bobbin 68b. In this construction, the filter 42 is supported by the leaf spring 54, 56, 58 and 60 while being joined with the bobbin 68b of the linear motor 68, and mounted on the lens block 46 through the brackets 62 and 64. The leaf springs 54 and 56 which face each other and the leaf springs 58 and 60 which also face each other limit the movable direction of the filter 42 to the operating direction of the linear motor 68. The leaf springs 54, 56, 58 and 60 are identical in dimensions and spring coefficient so that when the linear motor 68 is operated to displace the bobbin 68b, they are deformed by the same amount which corresponds to the displacement of the bobbin 68b, thereby preventing the filter 42 from tilting.

Figure 6:
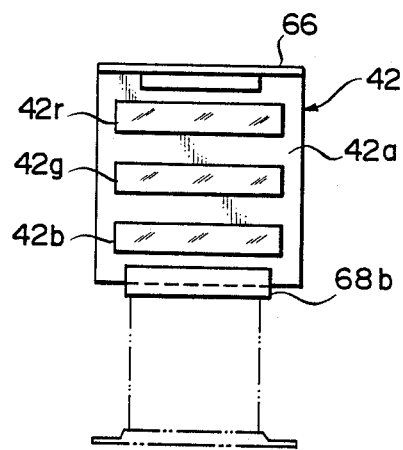
FIG. 6 is a front view of a filter applicable to the present invention.

Referring to FIG. 6, a specific configuration of the filter 42 is shown. As shown, the filter 42 comprises a frame 42a, and a red filter element 42r transparent for a red light component, a green filter element 42g transparent for a green light component and a blue filter element 42b transparent for a blue light component which are received in the frame 42. The distance between the filter elements 42r and 42g, the distance between the filter elements 42g and 42b, the portion outside the filter element 42r and the portion outside the filter element 42b are so dimensioned as to temporarily and completely intercept a light beam which is directed toward the line image sensor 44.

Assume that the filter element 42 is moved downwardly to bring the red filter element 42r into alignment with a light beam in place of the green filter element 42g, as shown in FIGS. 7A to 7D. During such a movement of the filter 42, that part of the frame 42a which intervenes between the filters 42g and 42r completely intercepts the light beam to prevent another light beam which has passed through the nearby filter from becoming incident to the line image sensor 44 at the same time, whereby mixture of colors is eliminated. In this particular embodiment, an arrangement is made such that while the linear motor 68 is not driven, the green filter element 42g is selected. This is because green is selected as a drop-out color when the image reader 30 is operated to read images monochromically.

As shown in FIGS. 5 and 8, the lens block 46 is formed with slots 46b and 46c so that the leaf springs 54 and 58 may be free to move between a position where the blue filter element 42b is selected as shown in FIG. 8 and a position where the red filter element 42r is selected as shown in FIG. 9.

Figure 10:
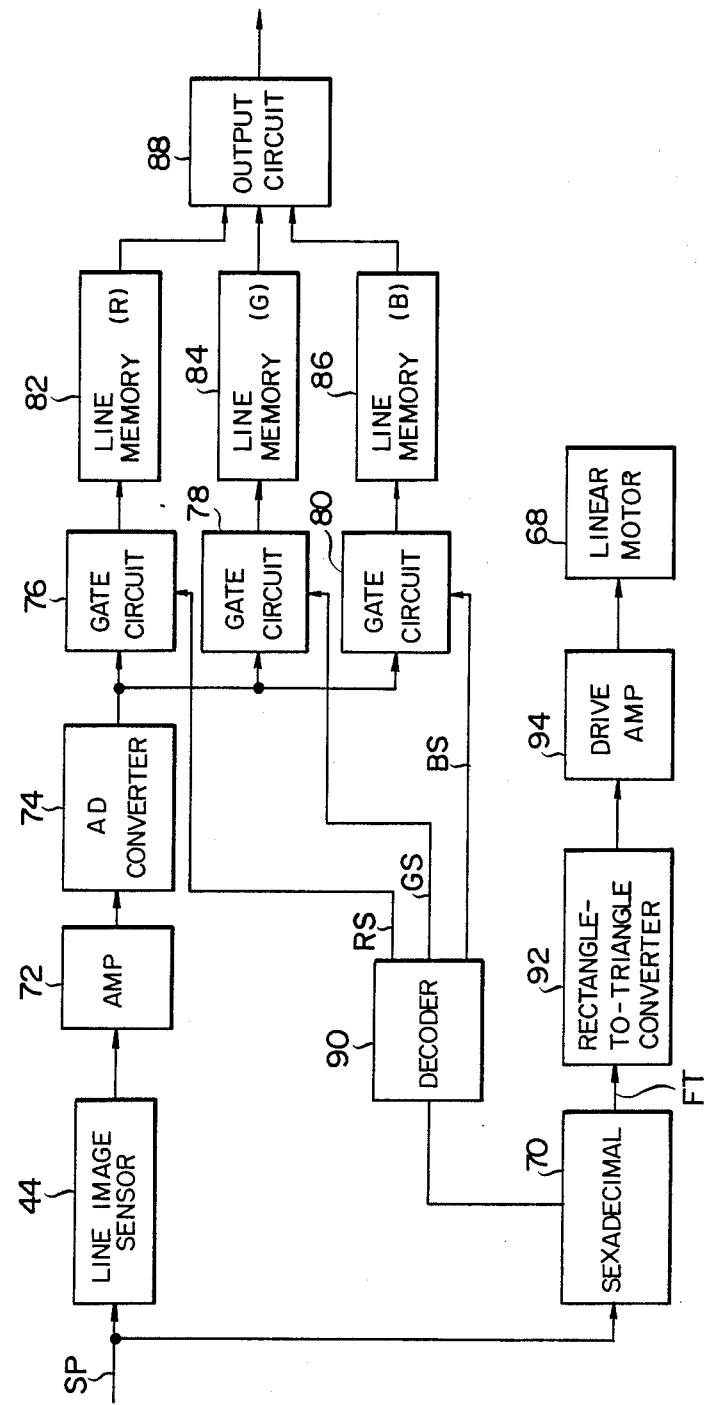
FIG. 10 is a block diagram showing a specific construction of a control system in accordance with the present invention.

Referring to FIG. 10, a control system in accordance with one embodiment of the present invention is shown. A main controller, not shown, of the image reader 30 generates a shift pulse SP timed to one step operation of a subscanning mechanism, not shown. The shift pulse SP is applied to the line image sensor 44 and a hexadecimal counter 70. In this particular embodiment, the frequency of the shift pulses SP is three times higher than the step frequency of the subscanning mechanism. The line image sensor 44 has a charge-coupled device (CCD) as a transfer gate. Timed to the input timing of a shift pulse SP, image signals stored till then are collectively transferred to the transfer gate and, thereafter, the image signals are delivered one bit at a time to an amplifier 72 in response to a predetermined shift clock, not shown. Therefore, the storing time in the line image sensor 44 is equal to the period of the shift pulses SP, and the period of the shift clock is predetermined such that the transfer of the image signals is completed within one period of the shift pulses SP.

The image signal from the line image sensor 44 is fed via the amplifier 72 to an analog-to-digital (AD) converter 74 to be thereby converted into a corresponding digital signal which has a plurality of bits. The digital signal is routed through any one of gate circuits 76, 78 and 80 to one of line memories 82, 84 and 86 which is associated with the gate circuit. The image signals stored in the line memories 82, 84 and 86 are transferred at suitable timings to the following device, by way of an output circuit 88.

The hexadecimal counter 70 is restored to an initial condition upon counting six shift pulses SP. The count CN of the counter 70 is applied to a decoder 90. Also, the counter 70 supplies a rectangle-to-triangle converter 92 with a filter drive timing signal FT which becomes (logical) high level during a period in which initial three shift pulses SP appear consecutively and becomes low level during a period in which the next three shift pulses SP appear (se FIG. 11B). The decoder 90 produces a red select signal RS which becomes high level while the count CN of the counter 70 is "1" or "2", a green select signal GS which becomes high level when the count CN is "3" or "6", and a blue select signal BS which becomes high level when the count CN is "4" or "5" (see FIGS. 11E, and 11F and 11G). The red select signal RS is applied to an enable input terminal of the gate circuit 76, the green select signal GS to an enable input terminal of the gate circuit 78, and the blue select signal BS to an enable input terminal of the gate circuit 80.

The rectangle-to-triangle converter 92 generates, timed to a positive going edge of the filter drive timing signal FT, a triangular wave signal TS which has a period six times greater than the period of the shift pulses SP and has opposite polarities, at a timing (or phase) at which the maximum negative level is reached. The triangular wave signal TS is fed to the linear motor 68 via a drive amplifier 94 so that the motor 68 is operated in response to each level of the signal TS moving the filter 42 to a particular position which is associated with the signal level. Hence, as the count CN of the counter 70 becomes "1" at a time t1 when the first shift pulse SP has arrived, the filter drive timing signal FT becomes high level and, therefore, the triangular wave signal TS reaches the maximum negative level. As a result, the linear motor 68 moves the bobbin 68b to the lowest position (i.e. draws it in by the largest amount) so that the uppermost part of the filter 42, i.e., the frame 42a outside the red filter element 42r comes to intercept the light beam, whereby the amount of light incident to the line image sensor 44 becomes "0" as shown in FIG. 11D. From this position, the filter 42 is moved upwardly. At the same time, the line image sensor 44 begins to transfer an image signal. Specifically, it sequentially deilvers an image signal stored during a just previous storing time in which a light beam has been passed through the red filter element 42r while, at the same time, the next storing time commences. At this instant, the red select signal RS becomes high level to enable the gate circuit 76 with the result that a digital signal corresponding to the image signal is stored in the line memory 82.

As the triangular wave signal TS is sequentially varied in level, the linear motor 68 is operated to move the filter 42 to a position associated with the level of the signal TS. Then, a light beam begins to be incident to one end of the red filter element 42r so that the amount of light received by the line image sensor 44 increases little by little. When the light beam has been fully aligned with the red filter element 42r, the amount of light incident to the line image sensor 44 becomes greatest. Thereafter, as the light beam begins to shift itself to the frame 42a via the other end of the red filter element 42r, the amount of light received decreases little by little. Just before a time t2 when the second shift pulse SP is outputted, the amount of light incident to the line image sensor 44 reaches "0" with the result that the storage of the image signal associated with the red filter element 42r is terminated. When a shift pulse SP has appeared at the time t2, the count CN of the counter 70 is increased to "2" to make the red select signal RS high level and cause the line image sensor 44 to start transferring an image signal. A digital signal corresponding to the image signal outputted by the sensor 44 is fed via the gate circuit 76 to the line memory 82.

It is to be noted that the instant when the procedure of image signal transfer, digital conversion and storage which was started at the time t1 is terminated, one line of image signals are stored in the line memories 76, 78 and 80 and, therefore, these image signals are read out via the output circuit 88. Hence, at the time t2 the effective data stored in the line memory 76 have already been read out, that is, an image signal stored in the following storing period can be stored in the line memory 76 from the time t1. Just after the time t2 the light beam begins to traverse the green filter element 42g so that the amount of light incident to the line image sensor 44 increases gradually, a storing time for storing a light beam which is passed through the filter 42g being started. When a shift pulse SP appears at a time t3 at which the light beam has fully traversed the filter element 42g and the storage of the image signal has been terminated, the count CN of the counter 70 is increased to "3" to make the red select signal RS low level and the green select signal GS high level. Consequently, a digital signal corresponding to the image signal which begins to be outputted by the line image sensor 44 at the time t3 is stored in the line memory 84 via the gate circuit 78.

Further, just after the time t3 the light beam begins to traverse the blue filter element 42b with the result that the amount of light incident to the line image sensor 44 is increased little by little, a storing time for storing the light beam which is passed through the filter 42b being started. As a shift pulse SP arrives just after a time t4 at which the light beamhas fully traversed the filter 42b and the storing time has ended, the count CN of the counter 70 is increased to "4" so that the green select signal GS becomes a low level and the blue select signal BS, high level. It follows that a digital signal corresponding to an image signal which starts to be outputted by the line image sensor 44 at the time t4 is applied to the line memory 86 via the gate circuit 80. Upon completion of the storage into the line memory 86, all the image signals representative of the image on the read line RL have been packed in the line memory 82, 84 an 86. Then, the image signals in the memories 82, 84 ad 86 are transferred to the following device via the output circuit 88.

In this manner, during the period in which the filter 42 is moved from the lowermost point to the uppermost point in one half the period of the triangular wave signal TS, reading, i.e., storage of an image on one read line RL is completed. Then, delayed by one period of the shift pulses SP, a read-out of an image signal and storage into the line memories 82, 84 and 86 are performed.

Meanwhile, at the time t4, the triangular wave signal TS reaches the maximum positive level causing the linear motor 68 to raise the bobbin 68b to the highest position (force it out by the largest amount). As a result, the lowermost part of the filter 42, i.e., the frame 42a outside the blue filter element 42b intercepts the light beam to reduce the amount of light received by the line image sensor 44 to "0". At this time t4, a cycle for storing the next image is started. In this cycle, the filter 42 is moved from the lowermost point to the uppermost point allowing the light beam to traverse the filter elements 42b, 42g and 42r in this sequence. At times t5, t6 and t7 when the storages of images associated with the respective filters have been completed, image signals associated with light beams which are passed through the filters 42b, 42g and 42r are read out and stored in the corresponding line memories 86, 84 and 82 as in the previously cycle. Upon completion of this cycle, the image signal associated with the red filter element 42r begins to be read out and stored at a time t7. At this instant, the image signals stored in the line memories 82, 84 and 86 are transferred to the following device via the output circuit 88 as an image signal which is representative of the next line.

As stated above, the filter 42 completes one vertical reciprocation during one period of the triangular wave signal TS. One line of image signals are stored and read out during each of time periods T1 and T2 which are respectively delayed by one period of the shift pulses relative to the time periods during which the filter 42 is moved upwardly and downwardly.

In the illustrative embodiment, the filter 42 and the bobbin 68b of the linear motor 68 which are joined with each other are supported by the four leaf springs 54, 56, 58 and 60. Therefore, it is only the energy consumed for the deformation of the leaf springs 54, 56, 58 and 60 that brings about a loss of kinetic energy. This allows a minimum or loss to occur in the linear motor 68 and, at the same time, suppresses generation of heat in the filter drive mechanism.

Because the filter 42 does not make contact with other members, it is prevented from being caught during movement and from becoming shaky due to wear. The device, therefore, achieves excellent durability and reliability.

Furthermore, because the support mechanism and the guide mechanism are implemented with a single means, the mechanisms are very simple and inexpensive.

The frequency of the shift pulses SP is selected to be three times higher than the step frequency of the sub-scanning mechanism, as previously described. This is to allow the read line RL to undergo one-step movement in one half the period of the triangular wave signal TS. However, where the line image sensor 44 is caused to read an image during either one of the periods of upward and downward movements of the filter 42, as is an alternative scheme in accordance with the present invention, the frequency of the shift pulses SP will be selected to be sime times higher than the step frequency of the subscanning mechanism.

Figure 12A:
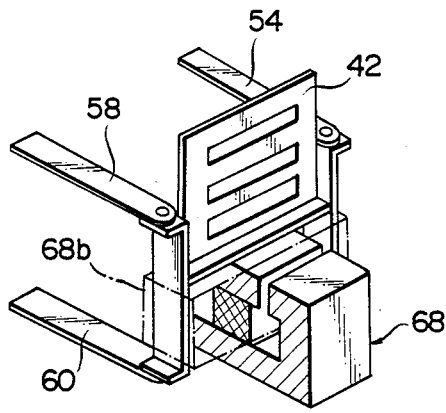
FIGS. 12A and 12B are fragmentary perspective views of other specific constructions of a mechanism for supporting the filter.
Figure 12B:
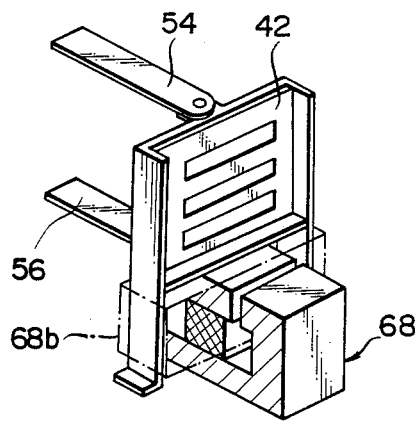

In the embodiment shown and described, the filter 42 and the bobbin 68b of the linear motor 68 are mounted integrally with each other, and the upper end of the filter 42 and the lower end of the bobbin 68b are supported by the four leaf springs 54, 56, 58 and 60. However, such a support arrangement is only illustrative and may be modified as desired. For example, as shown in FIG. 12A, the upper leaf springs 54 and 58 may be anchored to the sides of the filter 42 at an intermediate portion of the latter or, as shown in FIG. 12, the filter 42 and the bobbin 28b may be supported only by the leaf springs 54 and 56, respectively. Further, one leaf spring may be provided at the upper end of the filter and two leaf springs at the lower end or, conversely, two leaf springs may be provided at the upper end and one leaf spring at the lower end.

In this particular embodiment, in order that a light beam may be passed through the green filter 42g in a monochromatic read-out mode, the green filter element 42g is positioned at the center of the filter 42 to allow a light beam to become incident to the green filter element 42g while the linear motor 68 is not operated. It should be noted, however, that the positions of the filter elements 42g, 42b and 42r shown and described are not restrictive.

Figures 13A, 13B, 13C:
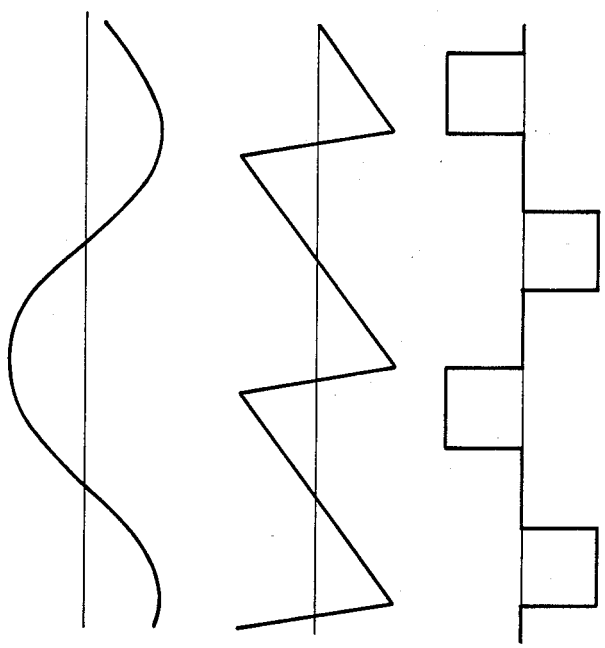
FIGS. 13A to 13C show waveforms showing other examples of drive signals which may be applied to a linear motor.

Further, the triangular wave signal adapted to drive the linear motor 68 may be replaced with a sinusoidal wave signal, a sawtooth wave signal or a step signal as shown in FIGS. 13A, 13B and 13C, respectively. If desired, the drive signal, whether it be sinusoidal, saw-toothed or stepwise, may be implemented with a digital signal which is approximately representative of the waveform.

While the filter 42 has been shown and described as being supported by leaf springs, it may alternatively be supported by a plurality of springs which are stressed in the vertical direction.

If necessary, the leaf springs may be anchored to the side periphery where the line image sensor 44 is mounted.

Concerning the line image sensor 44, a sequential read-out type line image sensor other than a CCD type one may be used. The filter may be provided with a sectorial configuration and supported at one point thereof to be reciprocally movable over a predetermined angle.

It is to be noted that the present invention is applicable to both of an image reader of the type in which an optical arrangement is moved and an image sensor in which a document is moved.

If desired, use may be of a surface sequential image read-out system in which read-out in a single color is repeated on each of different colors.

In summary, it will be seen that the present invention provides a color document image reader which separates colors adequately despite the simple and small-size construction while preventing movements of a filter in directions other than a predetermined reciprocating direction.

Various modifications will become possible for those skilled in the art after receiving the teachings of the present disclosure without departing from the scope thereof.

What is claimed is:

1. A device for reading a color image from a color original document, comprising:
    a line image sensor for decomposing the color image which is incident to a light-sensitive surface of said line image sensor into pixels each having a predetermined configuration and photoelectrically converting said pixels;
    an optical arrangement for conducting the color image located on the read line to said light sensitive surface of said line image sensor;
    flat filter means having a plurality of color separation stripe filters each having a predetermined size and separating a predetermined color component, said filters being spaced at a predetermined distance from each other and extending along the lenth of said light-sensitive surface wherein said predetermined distance is such that a light beam directed toward said line image sensor is temporarily and completely intercepted;
    filter drive means for driving said flat filter means in a reciprocal motion in a plane which is perpendicular to an optical axis so as to cause any one of said filters to move into alignment with said optical axis; and
    filter support means for supporting said filter means in such a manner as to allow said filter means to move in the direction of reciprocation while restricting movement of said filter means in other directions;
    wherein said filter support means comprises a plurality of leaf springs which are identical in dimensions and spring coefficient.

2. A device as claimed in claim 1, wherein said line image sensor comprises a CCD device.

3. A device as claimed in claim 1, wherein said filter means comprises a red, a blue and a green filter which are mounted at a predetermined distance from each other on a frame which is made of a light intercepting material.

4. A device as claimed in claim 3, wherein said filter drive means comprises a linear motor.

5. A device as claimed in claim 1, wherein said optical arrangement comprises a lens and a lens support for supporting said lens, said leaf springs being anchored to said lens support.

6. A device for reading a color image from a color original document, comprising:
    a line image sensor for decomposing the color image which is incident to a light-sensitive surface of said line image sensor into pixels each having a predetermined configuration and photoelectrically converting said pixels;
    an optical arrangement for conducting the color image located on the read line to said light sensitive surface of said line image sensor;
    flat filter means having a plurality of color separation stripe filters having a predetermined size and separating a predetermined color component, said filters being spaced at a predetermined distance from each other and extending along the length of said light-sensitive surface wherein said predetermined distance is such that a light beam directed toward said line image sensor is temporarily and completely intercepted;
    filter drive means for driving said flat filter means in a reciprocal motion in a plane which is perpendicular to an optical axis so as to cause any one of said filters to move into alignment with said optical axis; and
    filter support means for supporting said filter means in such a manner as to allow said filter means to move in the direction of reciprocation while restricting movement of said filter means in other directions,
    wherein said filter means comprises a red, a blue and a green filter which are mounted at a predetermined distance from each other on a frame which is made of a light intercepting material,
    wherein said filter drive means comprises a linear motor and wherein said green filter is aligned with said optical axis while said linear motor is not driven.

* * * * *